Figure 1:
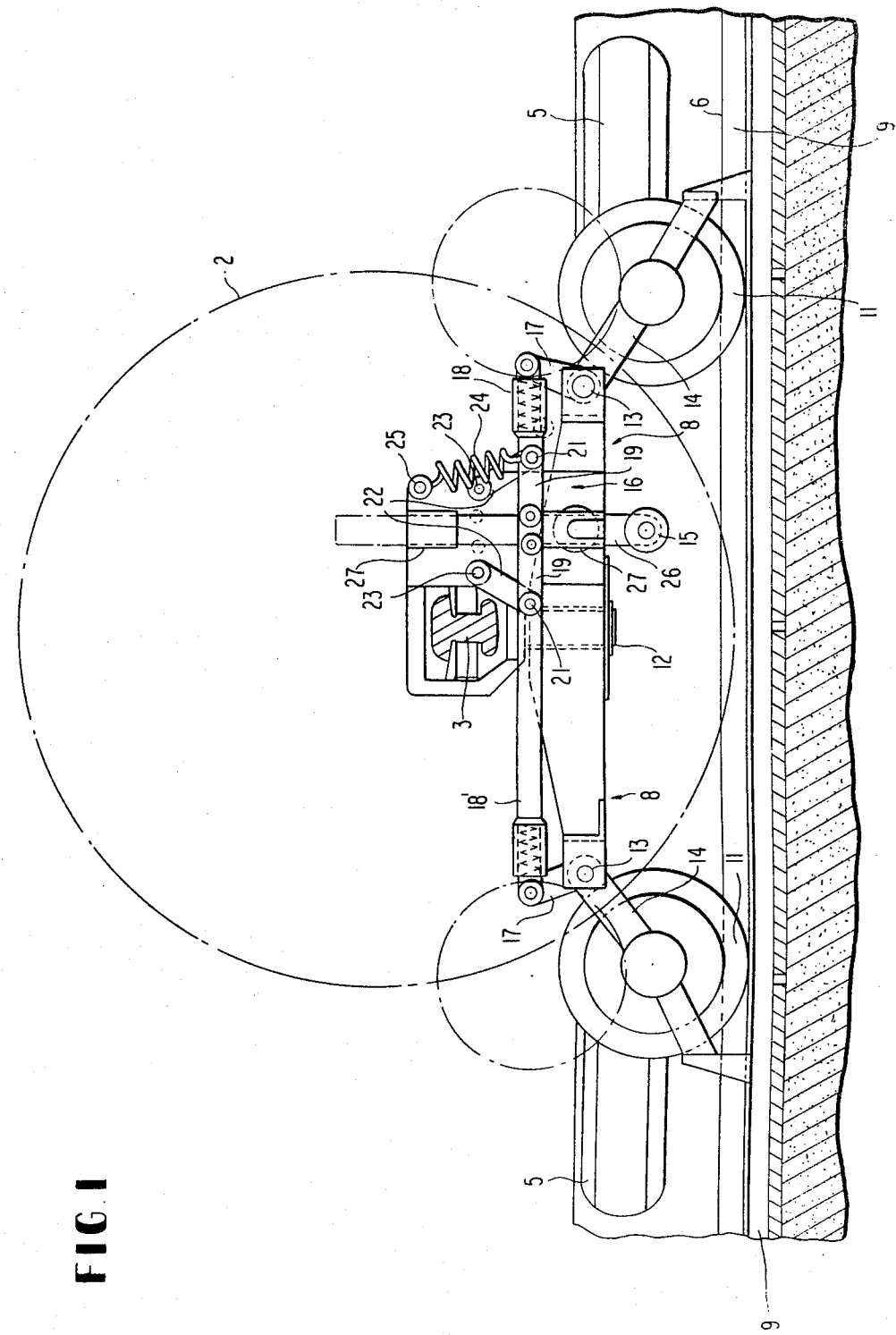

United States Patent [19]

Binder

[11] 4,403,553

[45] Sep. 13, 1983

[54] MOTOR VEHICLE ADAPTED FOR GUIDANCE ALONG A TRACK

[75] Inventor: Hellmuth Binder, Stuttgart, Fed. Rep. of Germany

[73] Assignee: Daimler-Benz AG, Stuttgart, Fed. Rep. of Germany

[21] Appl. No.: 243,772

[22] Filed: Mar. 16, 1981

[30] Foreign Application Priority Data

Mar. 14, 1980 [DE] Fed. Rep. of Germany ....... 3009857

[51] Int. Cl.³ .......................... B61F 9/00; B61F 13/00; E01B 25/28
[52] U.S. Cl. .................................... 104/245; 104/247; 105/215 C; 180/131
[58] Field of Search ............... 104/242, 245, 247, 185, 104/199, 119, 130; 105/215 C; 180/131, 79 C; 403/144, 132, 136, 133

[56] References Cited

U.S. PATENT DOCUMENTS

| | | | |
|---|---|---|---|
| 2,655,873 | 10/1953 | McDonald | 104/245 |
| 3,180,280 | 4/1965 | Kuch et al. | 104/245 |
| 3,367,616 | 2/1968 | Bausch | 403/144 |
| 3,717,108 | 2/1973 | Thompson, Jr. | 105/215 C |
| 3,730,105 | 5/1973 | Holley | 104/245 |
| 3,763,789 | 10/1973 | Olson, Sr. et al. | 104/242 |
| 3,942,449 | 3/1976 | Nelson | 104/242 |
| 3,980,025 | 9/1976 | Olson, Sr. et al. | 104/245 |

FOREIGN PATENT DOCUMENTS 1087471 8/1960 Fed. Rep. of Germany ....... 180/6.2

Primary Examiner—Bruce H. Stoner, Jr.
Assistant Examiner—Donald Halec
Attorney, Agent, or Firm—Craig and Burns

[57] ABSTRACT

A motor vehicle which may be utilized in a track or rail bound conveyance or on a normal roadway, with the vehicle including steerable supporting wheels and at least one transverse guide member arranged between opposite steerable supporting wheels on a horizontally pivotable track guide lever. The transverse guide member acts on the steerable supporting wheels and extends, in an operating position, below a tread level of the supporting wheels and, by way of a horizontal swivel joint in the track guide lever, can automatically be retracted from the operating position into an ineffective or waiting position and/or lowered into an operating position by roadway responsible roller feelers or the like movably guided at right angles to the driving direction. An expanding drive or force transmission system is coupled with the roller feeler with the system producing, upon a roller feeler movement, a movement oriented in a longitudinal direction of the vehicle. The drive system is movable to and fro between two defined end positions. A vertically movable section of the track guide lever carrying the transverse guide member is coupled by way of an angle lever and a coupling rod with the expanding drive system. The expanding drive system is constructed so as to be reaction free or self-locking in the end position corresponding to the operating position of the transverse guide member and the expanding drive system or a roller feeler guide unit are provided with an automatic end position securing arrangement.

19 Claims, 2 Drawing Figures

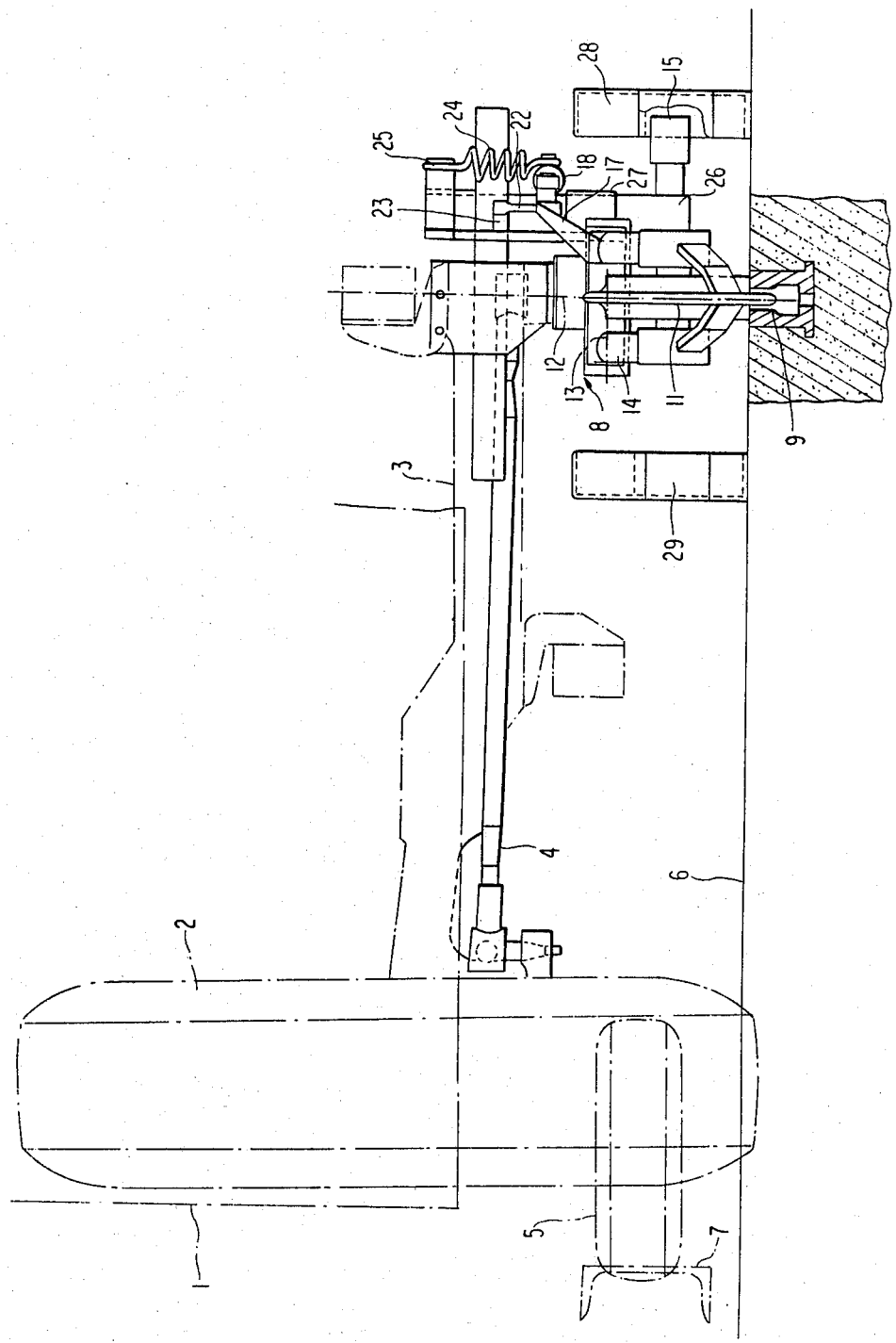

MOTOR VEHICLE ADAPTED FOR GUIDANCE ALONG A TRACK

The present invention relates to a motor vehicle and, more particularly, to a dual mode motor vehicle which is adapted to be driven over normal road surfaces or to be rail bound or track guided.

In, for example, German Pat. No. 1,087,471, a motor vehicle of the aforementioned type is proposed wherein the vehicle includes steerable supporting wheels having a horizontal tread and at least one transverse guide member arranged between opposite steerable supporting wheels on a horizontally pivotable guide track lever acting upon the steerable support wheels and extending below the tread level of the supporting wheels. The transverse guide member is, by means of a horizontal swivel joint in the track guide lever, to be automatically retracted from an operating position into an ineffective or idle waiting position and/or lowered into an operating position by roadway responsive roller feelers or the like movably guided at right angles to a driving direction of the vehicle.

In the arrangement proposed in the aforementioned German Patent, the transverse guide member on the track guide lever is lifted directly in order to enable a retraction of the transverse guide member into the waiting or idle position. In the waiting or idle position, a spring-loaded catch automatically engages and maintains the track guide lever in the waiting position against its own weight. To lower the transverse guide member into the operating position it is necessary to remove a mechanical locking or blocking arrangement of the track guide lever for the short period of time by a deflecting cam of the like provided on the side of the guide track and by a corresponding feeler lever so that the track guide lever can drop into the operating position due to the effects of gravity.

One disadvantage of the above noted proposed arrangement resides in the fact that the transverse guide member may be lifted out of the track groove by, for example, a stone or a tree branch and may be thrown or displaced upwardly into the waiting or idle position wherein the track guide lever is automatically locked in the position by the mechanical locking means. Thus, the vehicle may then roll along the guide track or guide lane unnoticed without guidance which may result in serious deleterious consequences.

A further disadvantage of the above-noted proposed arrangement resides in the fact that the vehicle is being operated along a normal roadway, i.e., not track or lane bound, the feeler lever for effecting the unlocking action of the transverse guide member may be deflected by a stone, a tree branch, or the like so that the track guide lever drops onto the surface of the road and may be caught in cracks in the road or, for example, grooves provided for streetcars thereby resulting in the wheels, which are to be steered manually during the normal driving operation, to be uncontrollably affected, whereby the vehicle may uncontrollably execute its own steering motions thereby leading to unforeseeable dire results.

While it would be possible to effect a retracting and lowering of the track guide lever by means of an auxiliary energy arrangement such as, for example, an auxiliary pneumatic or hydraulic system connected with well-proven switching control elements affected by sensing means or the like provided on the roadway, for safety reasons, such an approach would be undesireable because the lowering and lifting movements of the track guide lever must be executed safely even in case of a failure of the auxiliary force arrangement and/or of the control elements. To avoid the use of trouble-prone auxiliary arrangements, the better approach resides in deriving the force necessary for driving the track guide lever during a lifting and/or lowering of the guide lever by an inherent movement of the vehicle along the track or lane with the aid of cams, moldings, patterned profiles, or the like.

The aim underlying the present invention essentially resides in providing a mechanical drive mechanism which derives the necessary force or energy for a lifting or lowering of the guide track lever from the roadway and which renders impossible uncontrolled relatively long disengagement of the transverse guide member during a rail-bound utilization of the vehicle in addition to avoiding even an inadvertent lowering of the transverse guide member due to obstacles in the road or the like when the vehicle is operated without guide tracks or guide rails.

In accordance with advantageous features of the present invention, an expanding gear system is coupled with the roller feeler, with the gear system producing, upon roller feeler movement, a movement oriented in a longitudinal direction of the vehicle, and being movable to and fro between two defined end positions. A vertical movable section of the transverse guide lever carrying the transverse guide member is coupled, by way of an angle lever rigidly connected therewith and by way of a couplig rod essentially aligned in the longitudinal direction of the vehicle, with the expanding drive or force transmission system. The expanding drive or force transmission system is fashioned so as to be reaction free or self-locking in the end position corresponding to the operating position of the transverse guide member in such a manner that force effects from the roadway side of the track guide lever lowered into the operating position do not cause any retractions on the position of the expanding drive or force transmission system. The expanding drive or force transmission system or the roller feeder guide unit may be provided with an automatic end position securing means.

By virtue of the above-noted features of the present invention, the track guide lever is thus lifted or lowered through an insertion or interposition of the reversible expanding drive or force transmission system with the end position securing means rather than being lifted or lowered directly. The expanding drive or force transmission system is free of reaction or re-bound at least in a position corresponding to a lowered condition of the transverse guide member and thereby the transverse guide member cannot be constantly lifted automatically due to roadway obstacles in a zone of the guide groove of the guide track. Moreover, when the vehicle is operated on a normal roadway without rail or track guidance, the transverse guide member cannot be lowered by obstacles or the like into the road in an inadvertent manner for it is necessary to pull down the roller feeler coupled with the expanding drive or force transmission system, which is impossible by action of roadway obstacles of the like.

In accordance with further advantageous features of the present invention, the end position securing means is formed from a rocker arm articulated to the point of articulation between the expanding gear system and the coupling rod and pivotably mounted to a fixed point, and from a pivotable spring engaging in the region of the point of articulation and biasing of the rocker arm, depending upon the position, in a direction toward one of its two end positions.

Advantageously, the pivotable spring is fashioned as a tension spring and is attached to a fixed point lying approximately on a line of symmetry between the end positions of the rocker arm.

The expanding drive or force transmission system of the present invention is substantially constituted by an expanding fishplate articulated, on the one hand, to the coupling rod and being positively guided, on the other hand, along a track and furthermore being at least indirectly coupled with the roller feeler. The fishplate together with the coupling rod form a toggle lever linkage disposed approximately in a stretched or expanded position in the operating condition of the transverse guide member. The positively guiding track is, in accordance with the present invention, formed by a linear guide means guiding the roller feeler rod carrying the roller feeler, with the expanding fishplate being articulated to the roller feeler rod.

Advantageously, the coupling rod of the present invention is fashioned to be elastically resilient in a pressure or pushing direction that is fashioned to be rigid in a pulling direction.

The expanding drive or force transmission system and its coupling unit with the vertically movable part of the track guide lever are, advantageously, fashioned so that during downward movement of the roller feeler the transverse guide member is lowered and vice versa.

Accordingly, it is an object of the present invention to provide a dual mode motor vehicle which avoids, by simple means, shortcomings and disadvantages encountered in the prior art.

Another object of the present invention resides in providing a dual mode vehicle which ensures the proper operation of a guide member of the vehicle during a rail or track bound operation.

Yet another object of the present invention resides in providing a dual mode motor vehicle which prevents an inadverent lowering of a guide member due to obstacles on a surface of the roadway.

A further object of the present invention resides in providing a dual mode vehicle which includes a guidance system which is simple in construction and therefore relatively inexpensive to manufacture.

A still further object of the present invention resides in providing a dual mode motor vehicle which functions realiably during operation on a normal roadway as well as operation in a track or rail guided mode.

These and other objects, features, and advantages of the present invention will become more apparent from the following description when taken in connection with the accompanying drawings which show, for the purposes of illustration only, one embodiment in accordance with the present invention, and wherein:

FIG. 1 is a cross sectional view, taken in parallel to a longitudinal axis of the motor vehicle, through a front axle of a dual mode vehicle adapted to be guided along a rail, illustrating a lateral view of a lowerable track guide lever constructed in accordance with the present invention; and FIG. 2 is a partially schematic cross sectional front view of the arrangement of FIG. 1.

Referring now to the drawings wherein like reference numerals are used in both views to designate like parts and, more particularly, to FIG. 2, according to this figure, a motor vehicle 1 includes a front axle 3 having mounted thereon steerable supporting wheels 2, with each of the supporting wheels being respectively associated with two transverse guide rollers 5. The transverse guide rollers 5 slightly project beyond an outer configuration of the vehicle 1 and are mounted through rigid supporting arms (not shown) so as to be maintained at a constant relative position with respect to a wheel plane of the steerable supporting wheels 2. The transverse guide rollers 5 cooperate with transverse guide ridges or rails 7 arranged on both sides of a guide track or guide lane 6 and are adapted to impart direction to the steerable supporting wheels 2 when the dual mode vehicle is used in a rail or track bound operation.

The transverse guide ridges or rails 7 are omitted from one or both sides of the lane 6 in regions of roadway overlappings such as, for example, switches, intersections of guide tracks of the same kind, or intersections with normal roadways of general traffic. In these regions, an auxiliary transverse guidance system must be provided for maintaining the track guidance for the vehicle 1. The auxiliary transverse guidance system may readily be passed over by the rolling supporting wheels 2 with respect to a part of the system of the roadway side. For this purpose, a central guidance unit is provided which includes a track groove 9 provided on a roadway side of the vehicle 1 and a track guide lever generally designated by the reference numeral 8 provided on the vehicle side, with a transverse guide member 11 being provided as an auxiliary transverse guidance system. The transverse or track guide lever 8 in the illustrated embodiment is fashioned as a double lever which, starting from a vertical pivot or swivel axle 12 in a region of a carrier of the front axle 3, is pivotable in a horizontal plane and extends symmetrically toward the front and toward the rear and carries on both ends a flanged wheel forming the transverse guide member 11, which is adapted to extend into the track groove 9. The two transverse guide members 11 provided at the respective ends of the track guide levers 8 take over, in a region of the roadway overlapping, the function of the transverse guide rollers 5 arranged toward the outside of the vehicle, which guide rollers 5 are otherwise effective during a track or rail guide operation of the vehicle 1. One of the two track guide levers 8 is joined to one of the steerable supporting wheels 2 by a tie rod 4 so that by a horizontal pivoting of the track guide lever 8, a corresponding direction can be enforced on the steerable supporting wheels 2.

Although it is actually possible to effect a track guidance only by a central guide action by means of a track groove, in the interest of improved load-bearing capacity, a longer lifetime, and improved transverse comfort, it is a feature of the illustrated embodiment to provide for the normal route of track guidance an external guide means with the lateral transverse guide rollers 5 and transverse guide ridges or rails 7 provided on a side of the roadway or track and to provide the central guide means merely as an auxiliary transverse guidance system.

During a transition from rail bound or track bound operation to a non-track use of the vehicle, i.e., operation of the vehicle on a normal roadway, and also during a transition between external guidance and central guidance, the transverse guide member must respectively be lifted and lowered. A vertical operation of the track guide lever 8 when changing between external and internal guidance is required so that it is unnecessary to arrange, in an entire region of the external guidance, a central bottom groove for accommodating the dropping transverse guide member 11. Moreover, damage to the transverse guide member 11 due to obstacles in the lane or track in a region of the external guide means can be avoided by pulling the transverse guide member 11 upwardly.

The vertically movable lever section 14 is provided within the track guide lever, with the lever section 14 being connected with the remaining portion of the track guide lever 8 by a horizontal pivot or swivel joint 13 by way of which considerable force may be transmitted in a horizontal direction. The vertically movable lever section 14 accommodates the transverse guide member 11 which, as noted above, is formed as a flanged roller, with the transverse guide member 11 being combined with a clearing finger sliding in the track groove 9.

A vertical linear guide is provided in one of the two track guide levers 8 for guiding a roller feeler rod 26 which carries, at its lower end, a roller feeler 15. The roller feeler 15 respectively cooperates with extension and retraction cams 28, 29 mounted on respective sides of the roadway. A coupling between the roller feeler rod 26 and the vertically movable lever section 14 of the track guide lever 8, to be discussed more fully hereinbelow, is constructed in such a way that the roller feeler 15 and the transverse guide member 11 are moved in the same direction during a lowering and/or lifting so that, during a lowering of the transverse guide member 11 into the operating position shown in solid lines in FIG. 1, the roller 15 must be pulled downward and, during a lifting of the transverse guide member 11, the roller 15 must be urged upwardly into a waiting or idle position.

The roller feeler 15 projecting laterally from the roller feeler rod 26 must be covered from above in order to enable the same to be pulled down. Consequently, as shown in FIG. 2, the cam 28 provided on a side of the roadway includes a cam surface extending above the roller feeler 15. An unintended lowering of the transverse guide member 11 when the vehicle 1 is used without rails due to, for example, an obstacle in the road, is practically impossible due to the configuration of the above-noted coupling system of the present invention.

An upwardly oriented or extending angle lever 17 is rigidly connected to the vertically movable section 14 of the track guide lever 8. An upper end of the angle lever 17, during a vertical movement of the transverse guide member 11, executes a motion extending in a longitudinal direction of the vehicle 1. A coupling rod 18, extending in a longitudinal direction of the vehicle 1, is articulated to the angle lever 17 and is coupled at a point of articulation 21, FIG. 1, with an expanding drive or force transmission system generally designated by the reference numeral 16 which will be described more fully hereinbelow.

The expanding drive or force transmission system 16 is movable to and fro between two defined end positions and produces at the point of articulation 21 a movement oriented in the longitudinal direction of the vehicle for a lifting or lowering of the transverse guide member 11. The expanding gear system 16 is provided with an end position securing means also described more fully hereinbelow. Additionally, the expanding drive or force transmission system 16 is fashioned to be without the traction at least in the end positions shown in solid lines in FIG. 1, which means that an effect of a force on the coupling rod 18 remains without reaction on the vertical position of the roller feeler 15. Due to the dual arrangement of track guide levers 8 and transverse guide members 11, two expanding gear systems and associated coupling units with vertically movable lever sections 14 are provided in a mutual mirror-image symmetry. Only the coupling rod 18' shown on the left hand side of FIG. 1, is fashioned to be longer than the right hand coupling rod 18 due to the eccentric arrangement of the roller feeler rod 26.

As shown most clearly in FIG. 1, the expanding drive or force transmission system 16 is essentially made up of an expanding fishplate 19 articulated to the coupling rod and articulated to the roller feeler rod 26, with the fishplate 19 being positively guided with this end along a vertical track. The expanding fishplate 19, together with the coupling rod 18 or 18', constitutes a toggle lever linkage which, in an operating position of the transverse guide member 11 assumes the expanded position and thereby becomes free of reaction.

The point of articulation 21 is positively guided by a rocker arm 22 in a direction extending substantially at right angles to the positive guide track of the other point of articulation of the expanding fishplate 19. Instead of providing a guidance of the point of articulation 21 along a circular arc by the rocker arm 22, it is also possible to provide a linear guidance; however, the positive guidance of the point of articulation 21 by a rocker arm 22 is concomitantly utilized for the securing of the end position of the expanding gear system 16.

The end position securing means is essentially constituted by the above-noted rocker arm 22 engaging at the point of articulation 21 and pivotably mounted to a fixed point 23 of the track guide lever 8. The rocker arm 22 is likewise movable between two defined end positions in correspondence with the two end positions of the expanding drive or force transmission system 16 and/or parts connected therewith. A further fixed point 25 for a spring 24 fashioned as a tension spring is attached on a line of symmetry between the two end positions, with the spring 24 likewise engaging in the zone or region of the point of articulation 21. Due to a symmetrical arrangement of the spring 24 and rocker arm 22, the spring 24 always has a tendency to tension or bias the rocker arm 22 in a direction toward its end positions so as to thereby achieve an automatic end position securing action in an extremely simple manner.

The transverse guide member 11 may not be lifted out of the track groove 9 for a relatively long period of time due to roadway obstacles in the zone of the track groove 9. While it is true that a vertical escape of the transverse guide member 11 in an upward direction is possible, which is accomplished by the feature that a spring is installed in the coupling rod 18 or 18' so as to provide for an axial compression of the coupling rod; however, in a pulling direction, the two coupling rods 18, 18' are fashioned to be rigid by the provision of appropriate stops. Due to a stretched position of the expanding fishplate 19 and the coupling rod in an operating condition or position of the transverse guide member 11, the above noted reaction-free poverty of the expanding gear system 16 is attained. The position of the roller feeler rod 26 remains unaffected by an upwardly oriented pressure on the transverse guide member 11 due to, for example, roadway obstacles in the track groove 9.

In order to lift the transverse guide member 11 out of the illustrated operating position, the vehicle 1 must run with the roller feeler 15 over a disengagement cam 28 or 29 arranged on a side of the roadway, with the cam being located in the driving direction behind a lane section provided with central guidance. The roller feeler 15 is thereby forcibly urged upwardly during which time the expandable fishplate 19 passes over substantially into a vertical position and pulls the point of articulation 21 toward the roller feeler rod 26. By way of the coupling rod 18 and the angle lever 17, the vertically movable lever sections 14 are retracted upwardly with this movement. Due to the spring 24, the rocker arm 22 is retained in the position wherein it is pivoted toward the left and this would also hold true for other elements connected therewith. Consequently, a dropping of the transverse guide member 11 due to vehicle vibrations or due to obstacles in the road is no longer possible.

In order to lower the transverse guide member 11 into the operating position shown in solid line in FIG. 1, the roller feeler 15 must be pulled downwardly by an appropriate cam member 28 or 29 provided at the side of the roadway, which cam includes a cam surface extending over the feeler roller 15. Such an extensible cam member is provided in a driving direction forwardly of a region provided with central guidance.

While I have shown and described only one embodiment in accordance with the present invention, it is understood that the same in not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. Automobile vehicle usable as a rail-bound conveyance with steerable supporting wheels having a horizontal tread and with at least one transverse guide means arranged between opposite steerable supporting wheels on a track guide lever means which is pivotable in a horizontal plane which guide means acts on the steerable supporting wheels and extends in the operating position below the tread level of the supporting wheels, which transverse guide means, by means of a horizontal swivel axle in the track guide lever means, can be automatically retracted from the operating position into an ineffective waiting position and/or lowered into an operating position by road-way responsible roller feeler means, movably guided at right angles to the driving direction, characterized by the combination of the following features:

(a) an expanding gear system is coupled with the roller feeler, this gear system producing, upon roller feeler movement, a movement oriented in the longitudinal direction of the vehicle, and being movable to and fro between two defined end positions;

(b) a vertically movable section of the track guide lever carrying the transverse guide means is connected, via an angle lever means rigidly connected therewith and via a coupling rod essentially aligned in the longitudinal direction of the vehicle, with the expanding gear system;

(c) the expanding gear system is fashioned to be one of reaction-free or self-locking in the end position corresponding to the operating position of the transverse guide means so that force effects from the roadway side on the track guide lever means lowered into the operating position do not cause any reactions on the position of the expanding gear system;

(d) one of the expanding gear system and the roller feeler means comprising end position securing means for retaining the transverse guide means in the waiting position when not lowered into the operating position.

2. A motor vehicle according to claim 1, characterized in that means are provided for connecting the transverse guide means with at least one of the steerable supporting wheels so as to enable a control of the steerable supporting wheels by the transverse guide means.

3. A motor vehicle according to claim 2, characterized in that the means for automatically raising and lowering the transverse guide means further comprises
a feeler means at least indirectly coupled with the drive means for sensing the condition of the roadway, and in that
the means for connecting the vertically movable section with the gear system comprises
at least one angle lever means rigidly connected with the vertically movable section and
a coupling means arranged between the angle lever means and the gear system.

4. A motor vehicle according to claim 3, characterized in that the coupling means comprises
at least one coupling rod arranged so as to be essentially in alignment with a longitudinal direction of the vehicle.

5. A motor vehicle according to claim 4, characterized in that the securing means comprises
at least one rocker arm means having a first end pivotably mounted to a fixed member and a second end pivotably mounted to the coupling rod, and a spring means having a first end secured in an area of the pivotal connection of the rocker arm means and the coupling rod and a second end connected to a fixed member for normally urging, in dependence upon a position of the transverse guide means, the rocker arm means in a direction toward one of the two end positions.

6. A motor vehicle according to claim 5 characterized in that the spring means is a tension spring and is fixed to the fixed member at a point lying approximately along a line of symmetry of end positions of the rocker arm means.

7. A motor vehicle according to one of claims 4, 5, or 6, characterized in that the gear system further includes a plate means having a first end articulated to the coupling rod, means are provided for positively guiding a second end along a predetermined guide track, and in that the plate means and coupling rod are arranged so as to form a toggle lever linkage disposed approximately in an expanded position when the transverse guide means is in the operating position.

8. A motor vehicle according to claim 7, characterized in that the feeler means comprises a feeler roller means, and a rod means for carrying the feeler roller means, means are provided for articulatingly connecting the plate means with the rod means, and in that
the means for positively guiding the plate means comprises a linear guide means for guiding a displacement of the rod means.

9. A motor vehicle according to claim 8, characterized in that the coupling rod is constructed so as to be elastically resilient in a pushing direction and rigid in a pulling direction.

10. A motor vehicle according to claim 9, characterized in that the feeler roller means are connected with the gear system in such a manner that a downward displacement of the feeler roller means results in a lowering of the transverse guide means and an upward displacement of the feeler roller means results in a raising of the transverse guide means.

11. A motor vehicle according to claim 10, characterized in that the transverse guide means includes at least one flanged wheel adapted to be guided in a groove provided in the roadway.

12. A motor vehicle according to claim 1, characterized in that at least two transverse guide means are arranged between the steerable wheels, the track guide lever means includes at least two vertically movable lever sections for respectively carrying the transverse guide means, the track guide lever means is constructed as a double lever and the vertically movable lever sections are mounted at respective free ends of the double lever, and in that the connecting means are adapted to connect the two vertically movable lever sections with the gear system.

13. A motor vehicle according to claim 12, characterized in that the means for automatically raising and lowering the transverse guide means further comprises a feeler means at least indirectly coupled with the gear system for sensing the condition of the roadway, and in that
the connecting means comprises at least one angle lever means rigidly connected with the respective vertical movable lever sections, and coupling means arranged between the respective angle lever means and the gear system.

14. A motor vehicle according to claim 13, characterized in that the coupling means includes a first coupling rod having a first end articulatingly connected to one rocker arm means and a second end articulatingly connected to the feeler means, and a second coupling rod having a first end articulatingly connected to the other rocker arm means and the second end articulatingly connected to the feeler means.

15. A motor vehicle according to claim 14, characterized in that the first and second coupling rods are arranged so as to be essentially in alignment with a longitudinal direction of the vehicle.

16. A motor vehicle according to one of claims 14 or 15, characterized in that the securing means comprises at least one first rocker arm means having a first end pivotally mounted to a fixed member and a second end pivotally mounted to the first coupling rod, at least one second rocker arm means having a first end pivotally mounted to a fixed member and a second end pivotally mounted to the second coupling rod, and a spring means having a first end secured to one of the coupling rods at a position between the connection of the coupling rod to an associated angle lever means and a connection of the coupling rod with the feeler means.

17. A motor vehicle according to claim 16, characterized in that the spring means is a tension spring and is fixed to the fixed member at a fixed point lying approximately along a line of symmetry of end positions of the rocker arm means.

18. A motor vehicle according to claim 17, characterized in that each of the transverse guide means includes at least one flanged wheel adapted to be guided in a groove provided in the roadway.

19. Automotive vehicle in accordance with claim 1, wherein
said transverse guide means is pivotable about a vertical axis.

* * * * *